US010439995B2

(12) United States Patent
Tormasov et al.

(10) Patent No.: US 10,439,995 B2
(45) Date of Patent: Oct. 8, 2019

(54) METHOD AND SYSTEM FOR SECURE PRIVATE COMMUNICATIONS

(71) Applicant: Acronis International GmbH, Schaffhausen (CH)

(72) Inventors: Alexander G. Tormasov, Moscow (RU); Stanislav S. Protasov, Moscow (RU); Serguei M. Beloussov, Singapore (SG); Mark Shmulevich, Moscow (RU)

(73) Assignee: Acronis International GmbH, Schaffhausen (CH)

(*) Notice: Subject to any disclaimer, the term of this patent is extended or adjusted under 35 U.S.C. 154(b) by 69 days.

(21) Appl. No.: 15/404,395

(22) Filed: Jan. 12, 2017

(65) Prior Publication Data
US 2017/0201500 A1 Jul. 13, 2017

Related U.S. Application Data

(60) Provisional application No. 62/277,658, filed on Jan. 12, 2016.

(51) Int. Cl.
H04L 29/06 (2006.01)
H04L 12/58 (2006.01)
(Continued)

(52) U.S. Cl.
CPC .......... H04L 63/0428 (2013.01); H04L 51/04 (2013.01); H04W 12/001 (2019.01);
(Continued)

(58) Field of Classification Search
CPC ............. H04L 63/0428; H04L 2209/34; H04L 2209/608; G06F 21/36; G06T 1/0021;
(Continued)

(56) References Cited

U.S. PATENT DOCUMENTS

| 6,094,483 A * | 7/2000 | Fridrich | G06T 1/0021 |
| | | | 375/E7.026 |
| 2016/0134642 A1* | 5/2016 | Hamid | H04L 63/045 |
| | | | 713/160 |
| 2016/0239673 A1* | 8/2016 | Fascenda | G06F 21/6209 |

FOREIGN PATENT DOCUMENTS

KR 20140095024 * 11/2014

OTHER PUBLICATIONS

Kim, HYoung Joong. "machine translation of KR20140095024" Espacenet, Nov. 2015, pp. http://translationportal.epo.org/emtp/translate/?ACTION=description-retrieval&COUNTRY=KR&ENGINE=google&FORMAT=docdb&KIND=A&LOCALE=en_EP&NUMBER=20140095024&OPS=ops.epo.org/3.2&SRCLANG=ko&TRGLANG=en (Year: 2015).*

* cited by examiner

Primary Examiner — Shanto Abedin
Assistant Examiner — Carlos M De Jesus Lassala
(74) Attorney, Agent, or Firm — Arent Fox IP; Michael Fainberg

(57) ABSTRACT

A system and method for providing secure private electronic communications. An exemplary method includes encrypting a hidden message using an encryption scheme; encoding the encrypted hidden message in a source message; providing the source message having the encoded hidden message by a first electronic device; and transmitting a decryption key to a second electronic device. Moreover, the second electronic device can capture the encoded hidden message provided by the first electronic device, decode the hidden message, and extract the hidden message using the decryption key so that the hidden message can be rendered by the second electronic device.

17 Claims, 6 Drawing Sheets

(51) Int. Cl.
*H04W 12/00* (2009.01)
*G06T 1/00* (2006.01)
*H04N 21/8358* (2011.01)
*H04N 1/32* (2006.01)
*G06F 21/36* (2013.01)

(52) U.S. Cl.
CPC ........... *H04W 12/003* (2019.01); *G06F 21/36* (2013.01); *G06T 1/0021* (2013.01); *G06T 2201/0051* (2013.01); *G06T 2201/0065* (2013.01); *H04L 2209/608* (2013.01); *H04L 2209/80* (2013.01); *H04N 1/32144* (2013.01); *H04N 21/8358* (2013.01); *H04W 12/00508* (2019.01)

(58) Field of Classification Search
CPC .... G06T 2201/0051; G06T 2201/0065; H04N 21/8358; H04N 1/32144; H04W 12/001; H04W 12/003
See application file for complete search history.

METHOD AND SYSTEM FOR SECURE PRIVATE COMMUNICATIONS

CROSS REFERENCE TO RELATED APPLICATIONS

This application claims priority to U.S. Patent Provisional Application No. 62/277,658, filed Jan. 12, 2016, entitled "Method for Improving Security of Private Communications", the entire contents of which are hereby incorporated by reference.

TECHNICAL FIELD

This disclosure herein generally relates to private electronic communications, and more particularly, to a system and method for providing secure private electronic communications.

BACKGROUND

A modern trend for sending electronic text messages on mobile phones instead of making phone calls presents challenges with regard to security and privacy of these communications. For example, private messages are visible due to push-notifications on a locked screen, private messages are visible in a messaging history, and hiding private messages requires a switch to a specialized messenger application.

Furthermore, private messaging can only be used within a single messenger set up for this purpose. There are no applications that can be used with an arbitrary messenger or a chat system in order to make the communication private. Also, a conventional private messaging that can be installed on a mobile device reveals the fact that the user is actually hiding his communications. There is no mechanism of acquiring a secret message from another user device without jeopardizing the security.

Accordingly, there is a need for an efficient system and method for providing secure private communications between user devices.

SUMMARY

Accordingly, the present disclosure is directed to a system and method for improving security of private electronic communications that substantially obviates one or more of the technical disadvantages of conventional systems discussed above.

In one exemplary aspect, the system and method provides a software application that enables user to keep electronic messaging private. In particular, hidden messages are encrypted and encoded inside the text on one device. The message appears normal and the encoded part may only be visible to a camera of a receiving device. The hidden messaging application on the receiving device can extract the hidden encoded part from the text message and decrypt it prior to rendering it to a user of the receiving device.

According to one aspect, the hidden messaging application makes private messaging possible within nearly any existing messenger or chat application adopted for smartphone or other user device. The private messaging application combines the ease of use (no requirement for an extra messenger) application and confidentiality (no hidden messages in a plaintext form are displayed in history or on the locked screen).

Thus, according to an exemplary aspect, a method is disclosed for providing secure private electronic communications. According to an exemplary aspect, the method includes encrypting, by a computer processor, a hidden message using an encryption scheme; causing, by the computer processor, the encrypted hidden message to be encoded in a source message; causing, by the computer processor, the source message having the encoded hidden message to be provided by a first electronic device; and transmitting, by the computer processor, a decryption key to a second electronic device, such that the second electronic device can capture the encoded hidden message provided by the first electronic device, decode the hidden message, and extracts the hidden message using the decryption key so that the hidden message can be rendered on a display screen of the second electronic device.

According to another aspect of the exemplary method, the causing of the encrypted hidden message to be encoded in the source message comprises transmitting the encrypted hidden message to the second electronic device that encodes the hidden message using an encoding algorithm executed locally on the second electronic device.

According to another aspect, the exemplary method further includes encoding, by the second electronic device, the encrypted hidden message in the source message by modifying pre-defined black and grey borders of source text letters in the source message.

According to another aspect of the exemplary method, the causing of the source message having the encoded hidden message to be provided by the first electronic device comprises displaying the encoded hidden message in the source message on a display screen of the first electronic device.

According to another aspect, the exemplary method further includes capturing, by a video camera of the second electronic device, the encoded hidden message displayed on the display screen of the first electronic device.

According to another aspect of the exemplary method, the causing of the source message having the encoded hidden message to be provided by the first electronic device comprises providing the encoded hidden message by the first electronic device to the second electronic device by one of near-field communication, Bluetooth communication, and bump/vibration communication.

According to another aspect of the exemplary method, the causing of the encrypted hidden message to be encoded in the source message comprises encoding the encrypted hidden message in the source message by the computer processor, and the causing of the source message having the encoded hidden message to be provided by the first electronic device comprises transmitting the encoded hidden message to the first electronic device to be displayed thereon.

According to another aspect, an exemplary system is disclosed for providing secure private electronic communications. In this aspect, the system includes electronic memory configured to store a decryption key for an encryption scheme; and a computer processor configured to encrypt a hidden message using the encryption scheme, causing the encrypted hidden message to be encoded in a source message, causing the source message having the encoded hidden message to be provided by a first electronic device, and transmit the decryption key to a second electronic device, such that the second electronic device can capture the encoded hidden message provided by the first electronic device, decode the hidden message, and extracts the hidden message using the decryption key so that the hidden message can be rendered on a display screen of the second electronic device.

According to another aspect, a non-transitory computer readable medium comprising computer executable instructions is disclosed for providing secure private electronic communications. In this aspect, instructions are included for encrypting a hidden message using an encryption scheme; causing the encrypted hidden message to be encoded in a source message; causing the source message having the encoded hidden message to be provided by a first electronic device; and transmitting a decryption key to a second electronic device, such that the second electronic device can capture the encoded hidden message provided by the first electronic device, decode the hidden message, and extracts the hidden message using the decryption key so that the hidden message can be rendered on a display screen of the second electronic device.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Figure 1:
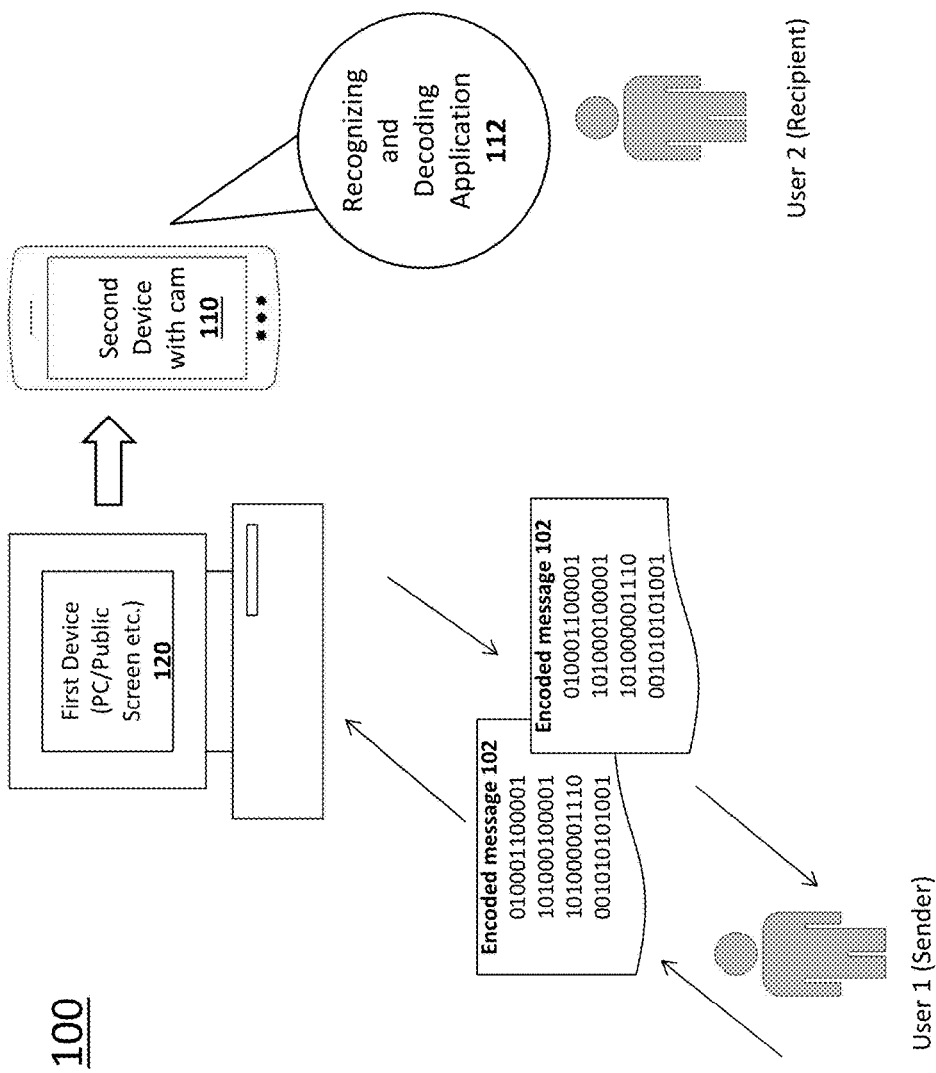
FIG. 1 illustrates a block diagram of a system for providing secure private electronic communications in accordance with an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below.

In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

FIG. 1 illustrates a block diagram of a system for providing secure private electronic communications in accordance with an exemplary aspect. As shown, system 100 includes a first user 1 that acts as the sender of an electronic message(s) and a second user 2 that acts as the recipient of the electronic message(s). Moreover, the system includes a first device 120, which is the displaying device of the electronic message and a second device 110, which can be a mobile phone, smartphone, tablet, personal computer, laptop, or the like, and which is configured to receive the message and privately and securely display it to user 2. As will be described below, the second device 110 is configured to receive the and decrypt the message. As a result, the first device 120 can receive and display a hidden version of the message (which may be encrypted), but the first device 120 does not store any keys (i.e., private or open keys), and there is no need to decrypt the message on first device 120.

According to the exemplary aspect, a software application enables users to keep user messaging private. In this aspect, private messages can be encrypted and encoded within regular non-secret text, also referred to as a "source" message, on the first device 120. The source message appears as a normal electronic message or a conventional text message on the display screen of the first device 120. However, the text can include a secret and encoded message (i.e., a "hidden" message) that is only visible and identifiable to the receiving device 110 after it is decrypted, for example. More particularly, in one aspect, the second device 110 includes a camera that is configured to capture the source message using image capture technology of the camera and read the encoded message. Thus, as further shown, the second device 110 includes a recognizing and decoding application 112 that serves as the secret messaging software application to extract the hidden encoded message from the source message and decrypt it (if it is decrypted in the exemplary aspect) before rendering the secret message to user 2 of the recipient device 110.

Furthermore, it should be appreciated that, in general, the second device 110 is configured to receive the source message from the first device 120 using a contactless technique way to extract the hidden message. The exemplary aspect uses a camera to capture the source message as a visual image in order to extract the hidden message from the first device 120. However, alternative aspects can be provided. For example, the source and hidden message can not only be sent using visual data (e.g., image or text or video data), but also it can be transmitted using audio data (e.g., soundwaves) where the source message can be a low-frequency oscillations, for example, where the second device 110 includes a microphone configured to capture the source message with the hidden data. Other mechanisms for capture the source message can be a seismic sensors, a NFC receiver or the like, for example. Important, the hidden message is embedded inside the source message to provide a communication by steganography techniques. As such, it should be appreciated that the system does not only encrypt the message, but also hide the fact of existence such encrypted message. Thus, the disclosed system provide a secure communication technique using a two-level scheme with two devices.

Thus, as shown, the sender can provide encoded messages 102 and use the first device 120, which can be a public screen or video monitor or the like, for example, to display the source message with encoded message 102. Moreover, the secret messaging application installed on the second device 110 makes private chatting possible within nearly any existing messenger or chat application. The private messaging application combines ease of use (i.e., no need for an extra messenger) and confidentiality (i.e., no secret messages in a plaintext form are displayed in history or on a locked screen).

Figure 2:
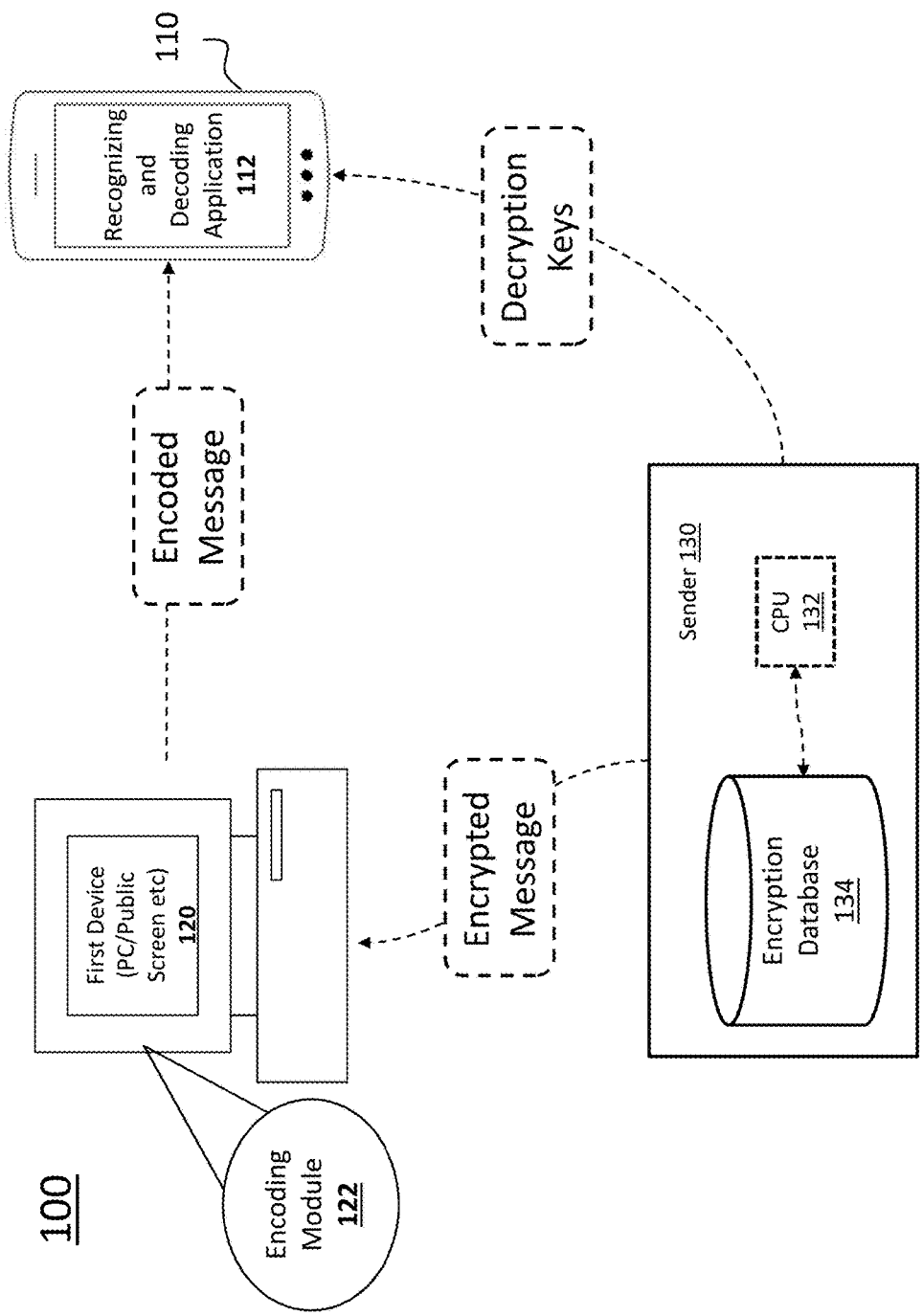
FIG. 2 illustrates a detailed flow diagram of the system shown in FIG. 1 for providing secure private electronic communications in accordance with an exemplary aspect.

FIG. 2 illustrates a detailed flow diagram of the system shown in FIG. 1 for providing secure private electronic communications in accordance with an exemplary aspect. More particularly, FIG. 2 illustrates the flow of data from each component in FIG. 1. In particular, the sender device 130 can be a server (or a computing device in communication with a server) and is configured to generate an encrypted message (i.e., the secret message). This encrypted message is then transmitted to the first device 120, which can be a smartphone, public display device, personal computer, television, or the like. In one exemplary aspect, the first device 120 includes an encoding module 122 that is an algorithm configured to receive the secret message and encode the secret message as part of a separate non-secret message, i.e., the source message.

Although not shown, the source message can be a textual electronic display generated by either the sender 130, the first device 120, or a third party device in communication with the first device. For example, according to an exemplary aspect, that User 1 can send a message or any type of files to the first device 120. As described above, the first device 120 can be a conventional person computer and it is not necessary in this aspect that any decoding/decryption keys are stored on this first device 120. In another aspect, the first device 120 can be a public device, such as an electronic billboard that shows different public messages, like greetings, announcements and the like. Users (e.g., User 1) can send their messages via SMS, web interface or the like. Moreover, User 2 does not necessarily need to stay close to first device 110, but can observe the presented message it from a distance with binocular or the like and make screenshots by the camera of the device.

Furthermore, according to the exemplary aspect, the encoding module 122 of the first device 120 is then configured to encode the source material with the encrypted message received from sender 130. In this aspect, the encoding is the hiding or embedding of one message (i.e., the hidden message) inside another (i.e., the source message). For example, according to one aspect, a hidden object (e.g., letters of a text message) is inserted inside a JPEG image as the source message. Most views will look only at the image and not know that there are some combinations of pixels or just bites inside that provide a hidden message. Moreover, as noted above, both the source message and hidden message can be any kind of data, such as image data, video data, audio data, or the like. For example, an audio message can be recorded initially and then another sound track can be imposed above it to hide the message. The recognize and decoding application 112 of the second device 110 is the only device that is configured to recognize the hidden information inside, especially if the hidden message is encrypted with the second device 110 having the decryption key.

In general, the term "module" as used herein can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

As further shown, in the exemplary aspect, the sender device 130 includes a central processing unit ("CPU") 132 and an encryption database 134. As will be explained in detail below, the encryption database 134 is configured to store one or a plurality of encryption and decryption keys. The CPU is configured to execute the encryption process for the secret message. Although not shown in detail, the sender device 130 includes electronic memory that stores executable code that is executed by the CPU 132 to execute one or a plurality of modules configured to perform the algorithms disclosed herein, including the encryption of the secret message, as will be described with regard to FIG. 3. Moreover, it should be appreciated that the type of encryption algorithm implemented by the disclosed system is not limited, and can be any type of encryption algorithm, such as, for example, Twofish, Serpent, AES (Rijndael), Blowfish, CAST5, RC4, 3DES, Skipjack, Safer+/++ (Bluetooth), IDEA, GOST, and the like.

In the exemplary aspect, the sender device 130 is configured to transmit the encoding module 122 to first device 120 to be installed thereon. Thus, when the sender device 130 transmits the encrypted secret message to the first device 120, the first device 120 receives the secret message and encodes the secret message within a source message using encoding module 122. In another aspect, the sender device 130 can perform the encoding directly before sending the encrypted and encoded message to the first device 120.

In either event, according to the exemplary aspect, the first device 120 is configured to display or otherwise provide or transmit the secret message once it is encoded in the source message. In other words, the first device 120 encodes the secret message within the source message. Moreover, the sender device 130 is separately configured to transmit one or more decryption keys to the second device 110, as shown. Thus, according to the exemplary aspect, the second device 110, which is the intended recipient of the secret message, is configured to decode the message from the encoded messages.

For example, as described above, the second device 110 includes a camera and the recognizing and decoding application 112. In one exemplary aspect, the second device 110, which as noted above can be a smartphone, for example, uses the software application 112 in the same manner as with "online translation" application used in iOS application WordLens or in Google Translate, for example. For example, the second device 110 can contains a program (e.g., a tool or software application), such as application 112, that knows the format and other metadata about receiving some external information (i.e., the source and hidden messages) from the first device 120. Then, this application 112 extracts a hidden message from public message that has been encoded. After the decoding process is complete, the hidden message can be additionally decrypted in the example where it has been decrypted. For example, in one exemplary aspect, the online translation application detects a position of text on the fly within an image or video received from the camera of the device, decodes it and replaces it with the message content without saving the message. In an alternative aspect, the second device 110 can save the message in encrypted/safe storage on electronic memory of the second device 110.

According to an exemplary aspect, the video camera of the second device 110 can be directed by user 2 to point to the hidden (i.e., encoded) data inside the source text on the display screen of the first device 120 to capture this message as video. As noted above, the first device 120 can be another smartphone screen, or any other user device screen, such as TV screen, computer screen, a jumbo screen, and the like) to acquire and display the screen image (or video). For example, in an exemplary aspect, the first device 120 can be one or more devices running live with SMS or TV screens available for anyone, or a public message pad in shopping center screens or a jumbo screen, for example.

Then, the hidden, but visibly detectable (by high resolution camera, for example) data is decoded on the second device 110 using the recognizing and decoding application 112. For example, the first device 120 can encode the encrypted message received from sender device 130 by encoding, for example, by a modification of the pre-defined black and grey borders of the source text letters. Once the encoded data is detected by first device 120, it can be decoded within the acquired image (or video) data and the image can be replaced on the fly in real-time by the image with the decoded data on the user device screen of second device 110, similar to Google Translate, which replaces the text with the translated text on the user device screen.

Figure 3:
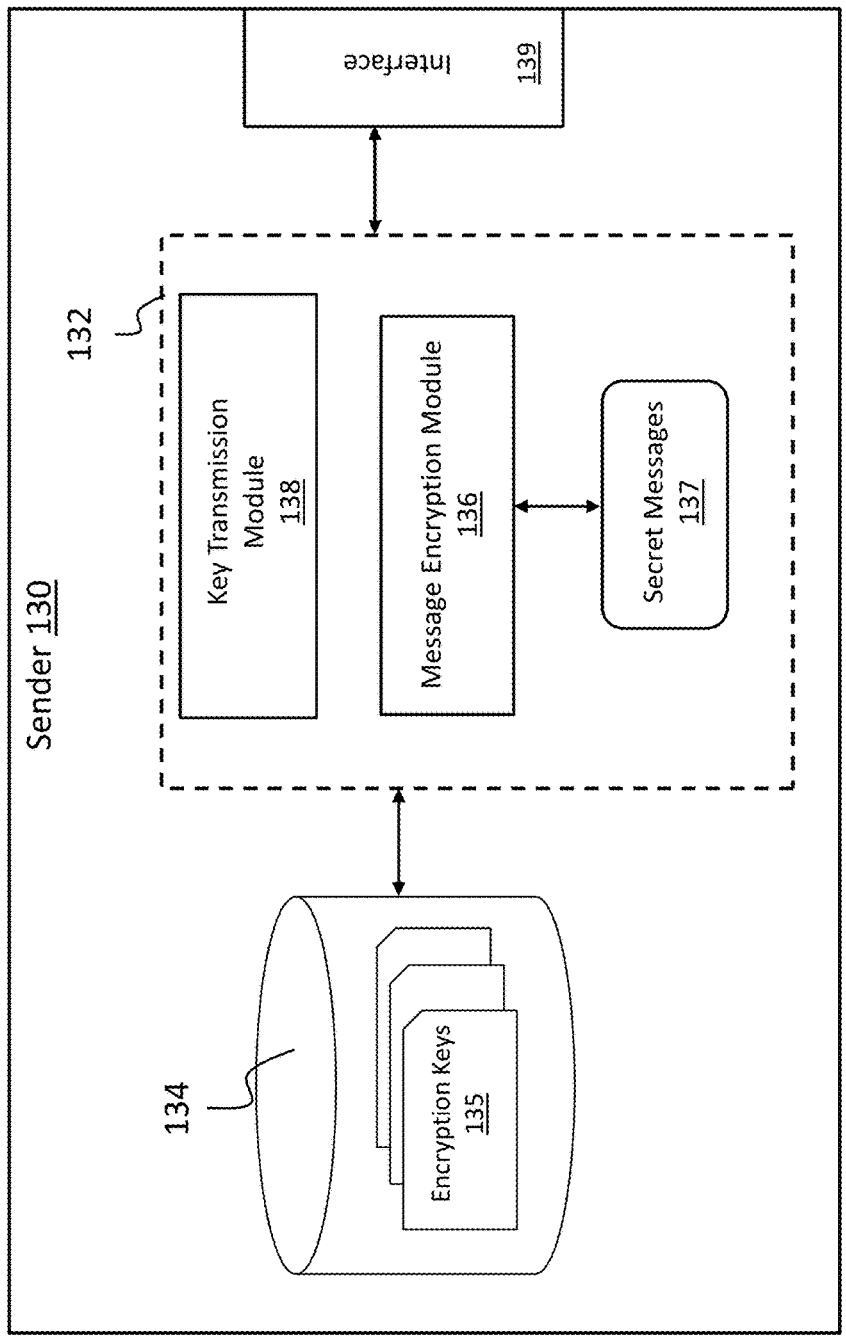
FIG. 3 illustrates a block diagram of the sending device of system for providing secure private electronic communications according to an exemplary aspect.

FIG. 3 illustrates a block diagram of the sending device 130 of system 100 according to an exemplary aspect. As noted above, the sending device 130 can be a server or computing device in electronic communication with a server. In one aspect, the sending device 130 includes a network interface 139 configured to transmit and receive data through a network with first device 120 and second device 110, for example.

Moreover, although not specifically shown, each computing component described herein, including sending device 130, is configured to communicate with each device over a network. According to the exemplary aspect, such network can be any network for communicating data and data operations and can include a communication system (not shown) that connects the various computers of the system by wire, cable, fiber optic, and/or wireless links facilitated by various types of well-known network elements, such as hubs, switches, routers, and the like. For example, the network may employ various well-known protocols to communicate information amongst the network resources. In one aspect, the network can be part of the Internet or intranet using various communications infrastructure such as Ethernet, WiFi and the like.

As further noted above, the sending device 130 includes CPU 132 that is configured to execute a number of software modules including message encryption module 136 and key transmission module 137. For example, one or more secret messages 137 can be received by sending device 130 and stored in electronic memory, for example. More particularly, the secret message can be input via a touchpad by a user of sending device 130 or can be received from another computing device and stored for transmission to second device 110.

In either case, message encryption module 136 is configured to encrypt the secret message by using an encryption scheme and, if applicable, accessing a corresponding encryption key 135 in encryption database 134. As noted above, the encryption algorithm is not limited to a specific scheme. For example, the encryption/decryption can be implemented by message encryption module 136 using a public key scheme or asymmetric key scheme. The asymmetric (i.e., public key encryption) can be used for setting the communication channel for distributing the symmetric encryption keys between the source and the decoder module on second device 110. Moreover, in an exemplary aspect, the encrypted message is transferred/transmitted to the first device 120, which encodes it as described above and displays it for capture by a recipient (second device 110). In another aspect, the encoded message may be transmitted from the first device 120 to the second device 110 using communication protocols, such short-distance near-field communication ("NFC"), Bluetooth communication, bump/vibration communication, video (images), or the like. In one aspect, the CPU of the sending device 130 can transmit instructions with the encrypted message to the first device 120 instructing device 120 to encode the encrypted message using the encoding module 122 and to display the encoded message on a screen thereof.

Furthermore, the key transmission module 138 is configured to transmit the private decryption key to the second device 110 to decrypt the secret message as discussed above. In one exemplary aspect, the sending device 130 is provided with (by the sender, for example) the secret message 137 and also metadata for the secret message including, for example, an identification of the intended recipient. This identification can be device ID for second device 110, an IP address associated with the second device 120 (which has previously been provided to sending device 130), or the like. Moreover, in certain aspects, the secret messages 137 may also include metadata linking the first device 120 and the second device 110 (also based on device identification, for example). In this regard, the sending device 130 is configured to identify the correct first device 120 to receive the encrypted secret message, encoding algorithm, and the like, as well as which receiving device 110 should receive the decryption key from key transmission module 138. As a result, the sending device 130 is adapted to coordinate the providing of the secret message to the intended recipient (i.e., the second device 110) in a secure and private manner as described above. In this regard, the sending device 130 can also transmit instructions to the second device 110 (or the instructions can be implemented in application 112) causing the second device 110 to capture the encoded message, decode the encrypted message, and extract the secret message using the decryption key transmitted by key transmission module 138.

Moreover, according to the exemplary aspect, it should be appreciated that the encryption/decryption and encoding and sending/receiving messages are split up between the two devices 110 and 120. Thus, the encryption and decryption is only performed on the second device 110. Moreover, the encrypted encoded data is acquired from the first device 120 and then decrypted by the second device 110. Advantageously, this process improves security because the keys are never stored and used by the first device 120, which can leak information or can be unsecure. Moreover, when using symmetric key encryption, several users can be recipients of the secret messages derived from the source device screen. According to the exemplary aspect, optical channels are used to decode secret messages.

Figure 4:
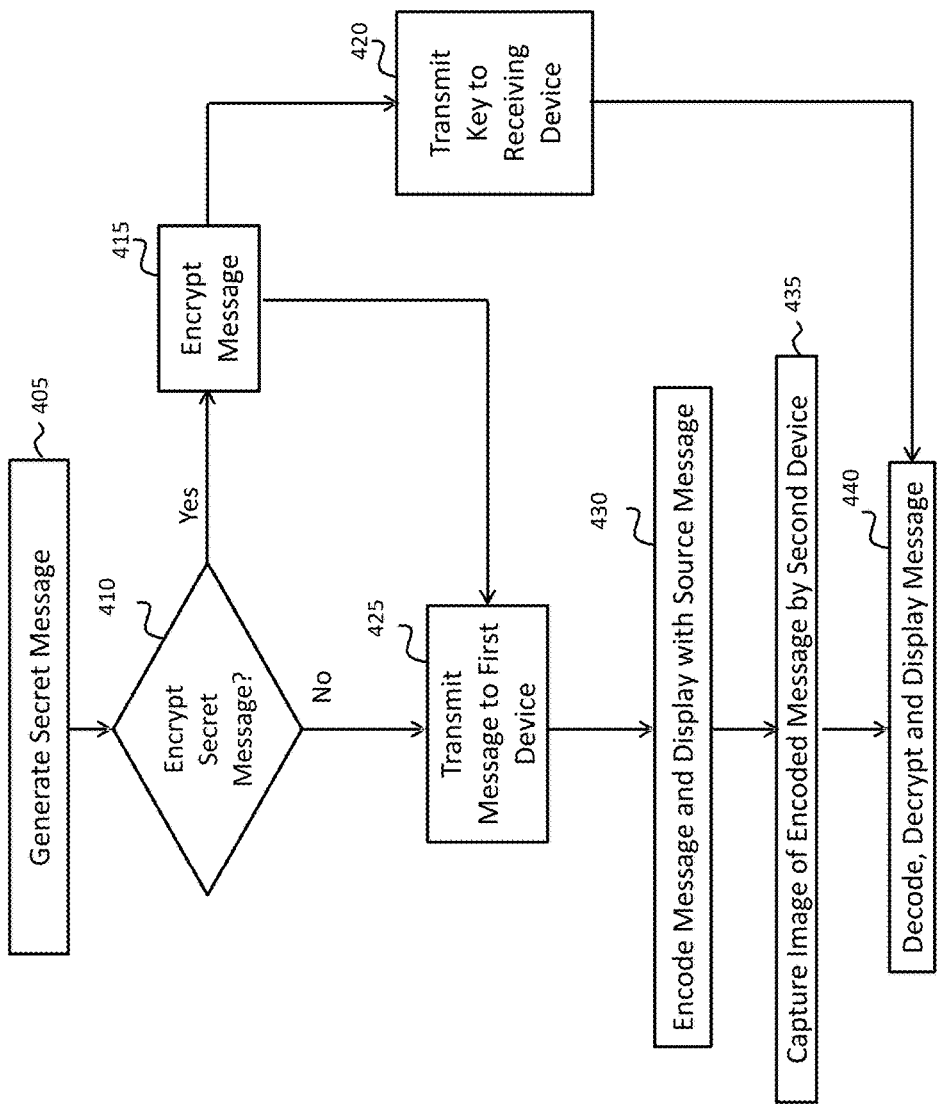
FIG. 4 illustrates a flowchart for a method for providing secure private electronic communications in accordance with an exemplary aspect.

FIG. 4 illustrates a flowchart for a method for providing secure private electronic communications in accordance with an exemplary aspect. It should be appreciated that the following description of the disclosed process refers to the exemplary components discussed above.

As shown, initially at step 405, a secret message is generated by a user, for example, of sending device 130. Next, at step 410, the sending device 130 determines whether the secret message should be encrypted. As described above, the exemplary aspect contemplates that the secret message is encrypted by a symmetric or asymmetric algorithm. Moreover, this decision to encrypt the secret message can be user-defined and on demand, for example, or based on a predefined setting (e.g., every message to a designated recipient is automatically encrypted). In another aspect, the encryption requirement can be disabled in which only encoding of the secret message is to be performed. In that case, the method proceeds directly to step 425.

However, assuming encryption is to be performed as determined at step 410, the method proceeds to step 415 where the message encryption module 136 of sending device 130 encrypts the secret message. Next, the method proceeds to steps 420 and 425, which can be performed in parallel or in sequence with respect to each other, but in no particular order. At step 420, the key transmission module 138 transmits the decryption key, which corresponds to the encryption algorithm used to encrypt the secret message, to the intended recipient device, e.g., second device 110. Moreover, the sending device 130 transmits at step 425 the encrypted message (unless encryption is disabled) to the first device 120.

Next, at step 430, the first device 120 encodes the secret message into text of a source message and displays the encoded message on its screen. At step 435, the second device 110 captures the encoded message using its video capture function, for example, when a user points the camera at the display screen of the first device 120 and records the encoded video. In an alternative aspect, the encoded video can be transmitted from the first device 120 directly to the second device 110, for example. Finally, at step 440, the first device 110 decodes the secret message, decrypts the secret message using the decryption key received at step 420, and privately displays the secret message to the user of the second device 110 on a screen thereof.

In view of the disclosed method, the secret data is extracted from a source message that appears normal. Moreover, the data is exchanged between the devices can be stored in the history, but the secret data can only be read using a special decoder application provided on the second device 110. Thus, the decrypted (plain text) data is entered on a source device and is never stored on either device and can only be shown on a user screen of a receiving device. Advantageously, the discloses system and method provides for improved security of electronic communications.

Figure 5:
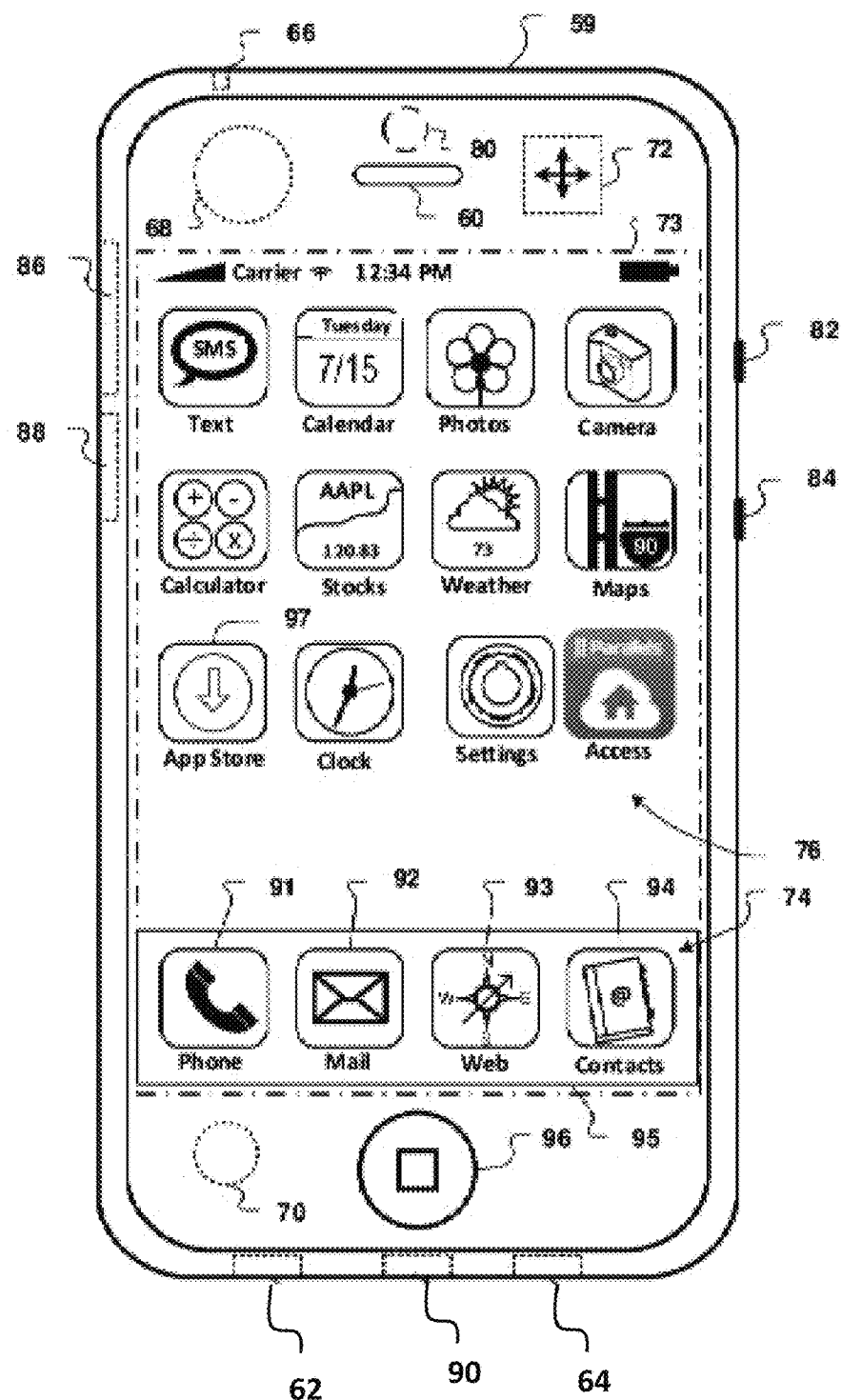
FIG. 5 illustrates a block diagram of an exemplary mobile device on which the recognizing and decoding application can be implemented according to an exemplary aspect.

FIG. 5 illustrates a block diagram of an exemplary mobile device 59 on which the recognizing and decoding application 112 can be implemented (e.g., second device 110). The mobile device 59 can be, for example, a personal digital assistant, a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video, including encoded message, such as those provided by first device 120. The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 6:
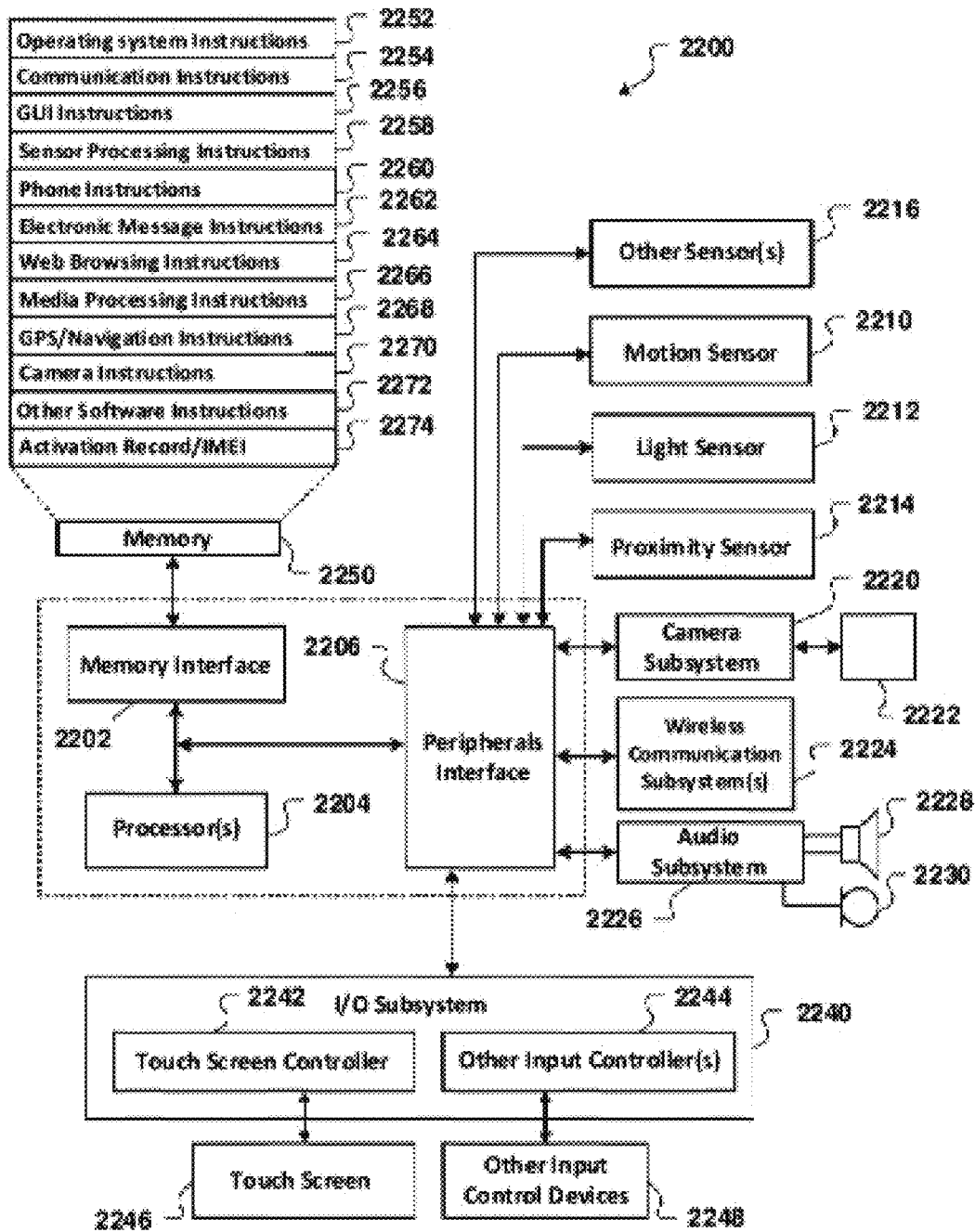
FIG. 6 illustrates a block diagram of an example of a general-purpose computer system (which may be a personal computer or a server) on which the disclosed systems and method can be implemented according to an example aspect.

FIG. 6 illustrates a block diagram 2200 of an example of a general-purpose computer system (which may be a personal computer or a server) on which the disclosed systems and method can be implemented according to an example aspect. The block diagram 2200 can correspond to mobile device 59, or one of the other computing devices such as first device 120 or sending device 130. The device 2200 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the device can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network (s) over which the device is intended to operate. For example, the computer may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions. The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the device on or off. The user may be able to customize a functionality of one or more of the buttons. The touch screen 2246 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player. The device may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more algorithms described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for providing secure private electronic communications, the method comprising:
   encrypting, by a computer processor of a sending device, a secret message using an encryption scheme;
   causing, by the computer processor, the encrypted secret message to be encoded in a source message by transmitting an encoding module and the encrypted secret message to a first electronic device that encodes the encrypted secret message using an encoding algorithm in the encoding module, the encoding module executed locally on the first electronic device;

causing, by the computer processor, the source message having the encoded secret message to be provided by the first electronic device; and transmitting, by the computer processor, a decryption key to a second electronic device, such that the second electronic device can capture the encoded secret message provided by the first electronic device, decode the secret message, and extract the secret message using the decryption key so that the secret message can be rendered by the second electronic device.

2. The method according to claim 1, further comprising encoding, by the first electronic device, the encrypted secret message in the source message by modifying pre-defined black and grey borders of source text letters in the source message.

3. The method according to claim 1, wherein the causing of the source message having the encoded secret message to be provided by the first electronic device comprises displaying the encoded secret message in the source message on a display screen of the first electronic device.

4. The method according to claim 3, further comprising capturing, by a video camera of the second electronic device, the encoded secret message displayed on the display screen of the first electronic device.

5. The method according to claim 1, wherein the causing of the source message having the encoded secret message to be provided by the first electronic device comprises providing the encoded secret message by the first electronic device to the second electronic device by one of near-field communication, Bluetooth communication, and bump/vibration communication.

6. The method according to claim 1,
wherein the causing of the encrypted secret message to be encoded in the source message comprises encoding the encrypted secret message in the source message by the computer processor, and
wherein the causing of the source message having the encoded secret message to be provided by the first electronic device comprises transmitting the encoded secret message to the first electronic device to be displayed thereon.

7. A system for providing secure private electronic communications, the system comprising:
electronic memory configured to store a decryption key for an encryption scheme; and
a computer processor of a sender device configured to:
encrypt a secret message using the encryption scheme,
causing the encrypted secret message to be encoded in a source message, by transmitting an encoding module and the encrypted secret message to a first electronic device that encodes the encrypted secret message using an encoding algorithm in the encoding module, the encoding module executed locally on the first electronic device;
causing the source message having the encoded secret message to be provided by the first electronic device
transmit the decryption key to a second electronic device, such that the second electronic device can capture the encoded secret message provided by the first electronic device, decode the secret message, and extracts the secret message using the decryption key so that the secret message can be rendered by the second electronic device.

8. The system according to claim 7, wherein the first electronic device is configured to encode the encrypted secret message in the source message by modifying pre-defined black and grey borders of source text letters in the source message.

9. The system according to claim 7, wherein the computer processor is further configured to cause the source message having the encoded secret message to be provided by the first electronic device by instructing the first electronic device to display the encoded secret message in the source message on a display screen of the first electronic device.

10. The system according to claim 9, wherein the second electronic device comprises a video camera configured to capture the encoded secret message displayed on the display screen of the first electronic device.

11. The system according to claim 7, wherein the computer processor is further configured to cause the source message having the encoded secret message to be provided by the first electronic device by instructing the first electronic device to provide the encoded secret message to the second electronic device by one of near-field communication, Bluetooth communication, and bump/vibration communication.

12. The system according to claim 7, wherein the computer processor is further configured to encode the encrypted secret message in the source message and transmit the encoded secret message to the first electronic device to be displayed thereon.

13. A non-transitory computer readable medium comprising computer executable instructions for providing secure private electronic communications, including instructions for:
encrypting a secret message using an encryption scheme at a sender device;
causing the encrypted secret message to be encoded in a source message by transmitting an encoding module and the encrypted secret message to a first electronic device that encodes the encrypted secret message using an encoding algorithm in the encoding module, the encoding module executed locally on the first electronic device;
causing the source message having the encoded secret message to be provided by the first electronic device; and
transmitting a decryption key to a second electronic device, such that the second electronic device can capture the encoded secret message provided by the first electronic device, decode the secret message, and extracts the secret message using the decryption key so that the secret message can be rendered by the second electronic device.

14. The non-transitory computer readable medium according to claim 13, further comprising instructions for encoding, by the first electronic device, the encrypted secret message in the source message by modifying pre-defined black and grey borders of source text letters in the source message.

15. The non-transitory computer readable medium according to claim 13, wherein the causing of the source message having the encoded secret message to be provided by the first electronic device comprises displaying the encoded secret message in the source message on a display screen of the first electronic device.

16. The non-transitory computer readable medium according to claim 15, further comprising instructions for capturing, by a video camera of the second electronic device, the encoded secret message displayed on the display screen of the first electronic device.

17. The non-transitory computer readable medium according to claim 13, wherein the causing of the source message having the encoded secret message to be provided by the first electronic device comprises providing the encoded secret message by the first electronic device to the second electronic device by one of near-field communication, Bluetooth communication, and bump/vibration communication.

* * * * *